(12) United States Patent
Chea, Jr. et al.

(10) Patent No.: US 6,671,149 B1
(45) Date of Patent: Dec. 30, 2003

(54) SYSTEMS AND METHODS FOR PROTECTING VULNERABLE MICRO ELECTRO-MECHANICAL SYSTEM (MEMS) AND ELECTRONIC RELAY DEVICES

(75) Inventors: Ramon C. W. Chea, Jr., San Jose, CA (US); P. Kingston Duffie, Palo Alto, CA (US); Harry Rodriguez, Gilroy, CA (US); Robert Crofford, Sunnyvale, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 374 days.

(21) Appl. No.: 09/677,483

(22) Filed: Sep. 28, 2000

(51) Int. Cl.[7] .............................. H02H 3/42; H02H 3/20
(52) U.S. Cl. ........................................ 361/87; 361/91.2
(58) Field of Search .............................. 361/87, 78, 79, 361/98, 91.2, 55, 56, 62, 94, 95

(56) References Cited

U.S. PATENT DOCUMENTS

| | | | | |
|---|---|---|---|---|
| 3,883,782 A | * | 5/1975 | Beckwith | 361/57 |
| 4,255,774 A | * | 3/1981 | Breen | 361/95 |
| 4,947,427 A | * | 8/1990 | Rosch et al. | 379/412 |
| 5,146,384 A | * | 9/1992 | Markovic et al. | 361/91 |
| 5,177,657 A | * | 1/1993 | Baer et al. | 361/45 |
| 5,198,957 A | * | 3/1993 | Weity et al. | 361/18 |
| 5,272,588 A | * | 12/1993 | Motoori | 361/119 |
| 5,440,441 A | * | 8/1995 | Ahuja | 361/62 |
| 5,768,341 A | * | 6/1998 | Pryor et al. | 379/22 |
| 6,108,183 A | | 8/2000 | Beene | 361/93.8 |
| 6,128,169 A | * | 10/2000 | Neiger et al. | 361/42 |

FOREIGN PATENT DOCUMENTS

| | | |
|---|---|---|
| EP | 0 291 169 | 11/1988 |
| EP | 0 913 980 | 5/1999 |
| WO | WO 00/36809 | 6/2000 |
| WO | WO 01/18934 | 3/2001 |

* cited by examiner

Primary Examiner—Rajnikant B. Patel
(74) Attorney, Agent, or Firm—Pillsbury Winthrop LLP

(57) ABSTRACT

The present invention discloses systems and methods for protecting electronic devices (switching and non-switching) such as micro electro-mechanical system (MEMS) devices and solid state relays due to lightning exposure or electrical power surges. An over voltage protector and an over current protector are used to limit the exposure of high voltages and currents to the MEMS devices and solid-state relays. A relay or equivalent device is energized when a high current is sensed in the loop, which relay is used to protect the MEMS devices and solid state relays from damage. The relay can be controlled via software/hardware and works in conjunction with other components/devices in the overall systems. In this manner, any number of MEMS devices or solid state relays can be protected.

32 Claims, 6 Drawing Sheets

SYSTEMS AND METHODS FOR PROTECTING VULNERABLE MICRO ELECTRO-MECHANICAL SYSTEM (MEMS) AND ELECTRONIC RELAY DEVICES

FIELD OF THE INVENTION

The present invention relates to systems and methods for protecting devices (switching and non-switching) such as micro electro-mechanical system (MEMS) and electronic relay devices in telecommunication systems. More particularly, the present invention is directed to systems and methods for protecting vulnerable MEMS and electronic relay devices due to lightning exposure or electrical power surges. The present invention can be implemented in telecommunication systems, which have direct physical connection to the outside copper wire plant such as telephony and/or DSL system equipment.

BACKGROUND OF THE INVENTION

Micro electro-mechanical system (MEMS) devices and solid-state relays (SSR) have recently been developed as alternatives for conventional electromechanical switching devices such as relays. As is well known, the conventional devices possess some highly desirable characteristics such as low contact resistance, high voltage breakdown, and relatively high current handling capability, which characteristics make them ideal for use in telecommunication systems. However, a major drawback associated with such conventional devices is that they are not well suited for miniaturization or integration.

MEMS devices and SSR can perform the standard functions of conventional relays and are well suited for miniaturization and integration. MEMS devices are basically miniaturized electromechanical devices that are fabricated using techniques similar to those used for semiconductor integrated circuits and are well suited for low cost and high volume production. MEMS device applications have been used as pressure sensors, chemical sensors, light reflectors, switches, and relays. MEMS devices are low cost devices due to the use of microelectronic fabrication techniques, and new functionality may also be provided because they are much smaller than conventional devices.

However, the MEMS devices and SSR have several major shortcomings and disadvantages. The most notable disadvantage is that these devices are relatively fragile in current carrying and voltage breakdown capabilities. For example, because the MEMS devices and SSR are relatively fragile, lightning or AC power surges can completely destroy them. Lightning is characterized by very high voltage and current of very short duration pulses, i.e., less than 1.0 ms, whereas AC power surges or faults are characterized by very high voltage and current of relatively long duration pulses, i.e., seconds. As a result, systems having MEMS devices or SSR therein can become disabled and/or destroyed quite easily.

There are currently different systems and methods for protecting the MEMS devices and SSR from lightning and/or AC power surges. But, none of these conventional systems and methods is directed towards protecting the MEMS devices and SSR that are implemented within units such as cross connect systems, e.g., the "CX 100 CrossConnect System" from Turnstone Systems, Inc. The CX100 Copper CrossConnect System is a platform that automates the physical layer infrastructure in the central office, enabling ILECs (incumbent local exchange carrier) and CLECs (competitive local exchange carrier) to remotely control, test, and manage a copper loop. Additional information regarding Turnstone System's CX100 Copper CrossConnect System can be found at its web site turnstone.com. It is also noted that other systems and units providing similar functionalities as the CX100 Copper CrossConnect System can be implemented in the present invention.

As stated above, the conventional systems and methods for protecting MEMS devices and SSR are found to be inadequate and unworkable in units such as those described above. Accordingly, there is a need for reliable and efficient systems and methods for protecting vulnerable MEMS and electronic relay devices due to lightning exposure or electrical power surges.

SUMMARY OF THE INVENTION

In view of the above-described problems of the prior art, it is an object of the present invention to provide systems and methods for protecting vulnerable MEMS and electronic relay devices due to lightning exposure or electrical power surges.

It is yet another object of the present invention to provide systems and methods limiting exposure to high voltages and currents to the MEMS devices and solid state relays.

It is a further object of the present invention to provide systems and methods for sensing a high current condition and thereby energizing a relay to protect the MEMS devices and solid state relays.

It is still a further object of the present invention to provide systems and methods for energizing a relay to protect devices (switching and non-switching) such as MEMS devices and solid state relays.

It is yet a further object of the present invention to provide systems and methods for monitoring the system after lightning exposure or electrical power surges.

These and other objects of the present invention are obtained by providing an over voltage protector and an over current protector in the units having devices such as the MEMS devices or solid-state relays. The over voltage protector is used to protect against fast rising voltage pulses such as lightning exposure, whereas the over current protector is used to protect against lower voltage than lightning exposure, but high current such as an electrical power surge. Accordingly, a relay is energized when a high current is sensed in the loop, which relay is used to protect devices such as the MEMS devices and SSR from damage. The relay can be controlled via software/hardware and works in conjunction with other components/devices in the overall system. The present invention can be implemented to protect any number of MEMS devices or SSR in a unit.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which.

DETAILED DESCRIPTION OF THE PREFERRED EMBODIMENTS

Figure 1:
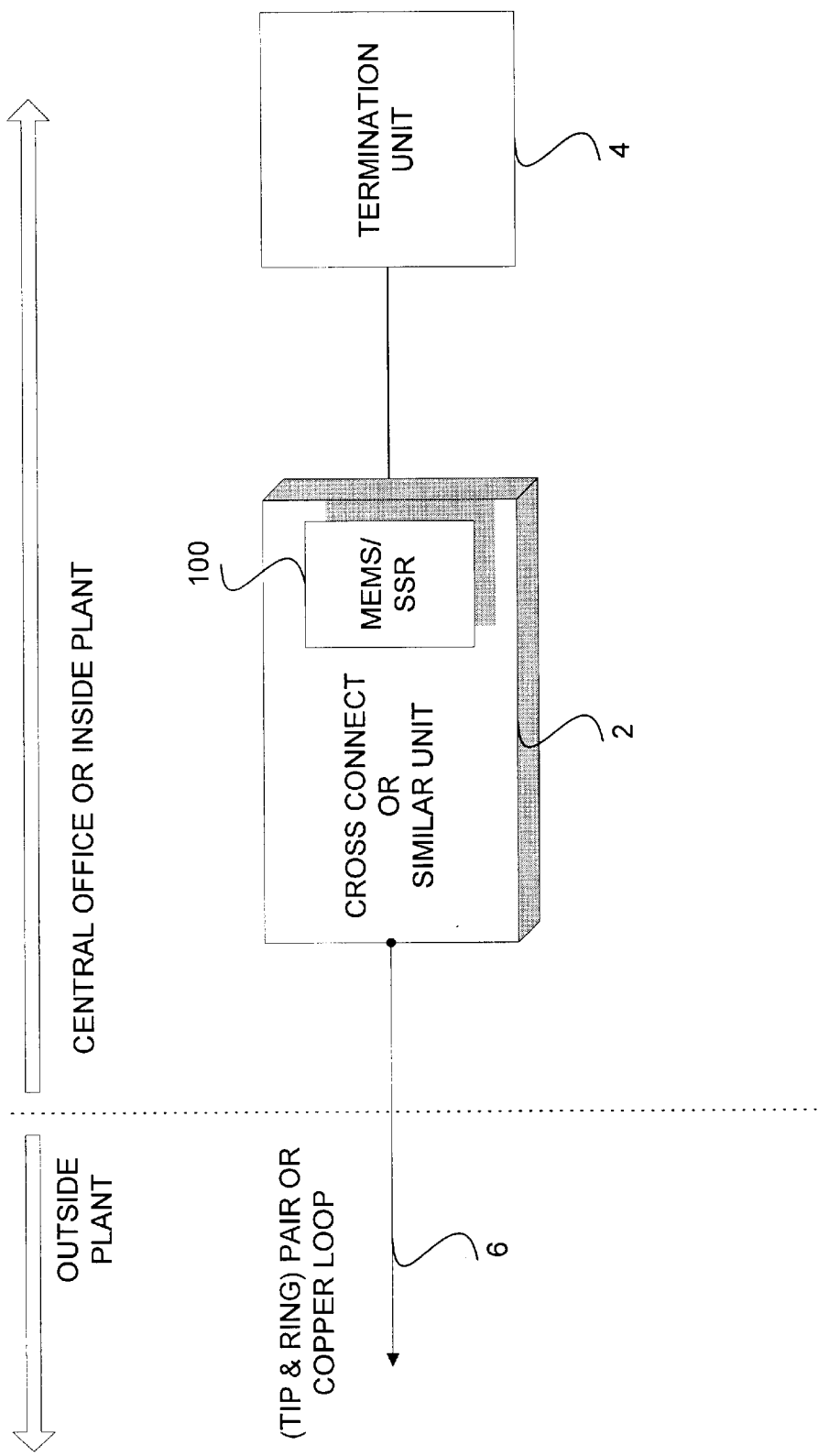
FIG. 1 illustrates a simplified block diagram in accordance with the preferred embodiment of the present invention.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 1–7, wherein like components are designated by like reference numerals throughout the various figures. Further, specific parameters such as system architecture, circuit layouts, electronic components, component values, and the like are provided herein, and are intended to be explanatory rather than limiting.

The present invention is directed to systems and methods for protecting devices (switching and non-switching) such as MEMS and electronic relay devices. In other words, the present invention is directed to systems and methods for protecting vulnerable MEMS and electronic relay devices due to lightning exposure or electrical power surges, and in particular, the use of these type of devices in telecommunication equipment such as the Turnstone CX100 Copper CrossConnect System. This is accomplished by introducing the combination of an over voltage protector, an over current protector, and a relay $K_p$ in the circuitry. The relay $K_p$ used herein is preferably an electromechanical type relay or any equivalent device (e.g., solid state relay) and should be sufficiently robust to survive and tolerate the high currents and voltages that result from lightning exposure or electrical power faults.

The over voltage protector limits/clamps the voltage that is exposed to the vulnerable devices, and the over current protector is used to sense a high current such that the relay $K_p$ is energized to block the high current flow from damaging or destroying the MEMS or electronic relay devices. The over voltage protector is also used to protect against fast rising voltage pulses such as lightning exposure, whereas the over current protector is used to protect against voltage faults slightly lower than lightning, but having high current of longer duration. Preferably, the elapsed time from detection of an over current condition to removal of the current from the loop should be less than 10.0 ms.

FIG. 1 illustrates a simplified block diagram in accordance with the preferred embodiment of the present invention. In this diagram, a cross connect or similar unit 2 (hereinafter defined as "MEMS unit") having MEMS devices or SSR array 100 (collectively known hereinafter as "MEMS device") therein is connected to a termination unit 4 in the central office or inside plant. The termination unit 4 can be a DSL access multiplexer (DSLAM), POTS line circuit, line card, etc. The term "switching device" used herein is defined as any electronic, electromechanical, etc. device such as MEMS, SSR, and conventional mechanical relay that has switching capabilities.

The MEMS unit 2 is also connected to a tip and ring pair (i.e., copper loop) 6 to the outside plant. The tip and ring pair 6 is used to deliver both voice and/or data services to customers and generally terminates at a customer premise (residential, business, small office/home office—SOHO, etc.). The MEMS device 100 within the MEMS unit 2 is typically exposed to a certain level of voltage and current that is tolerable. However, these devices can be easily damaged or destroyed when they are exposed to high voltages or currents. The present invention is intended to protect the MEMS devices 100 from such conditions.

Figure 2:
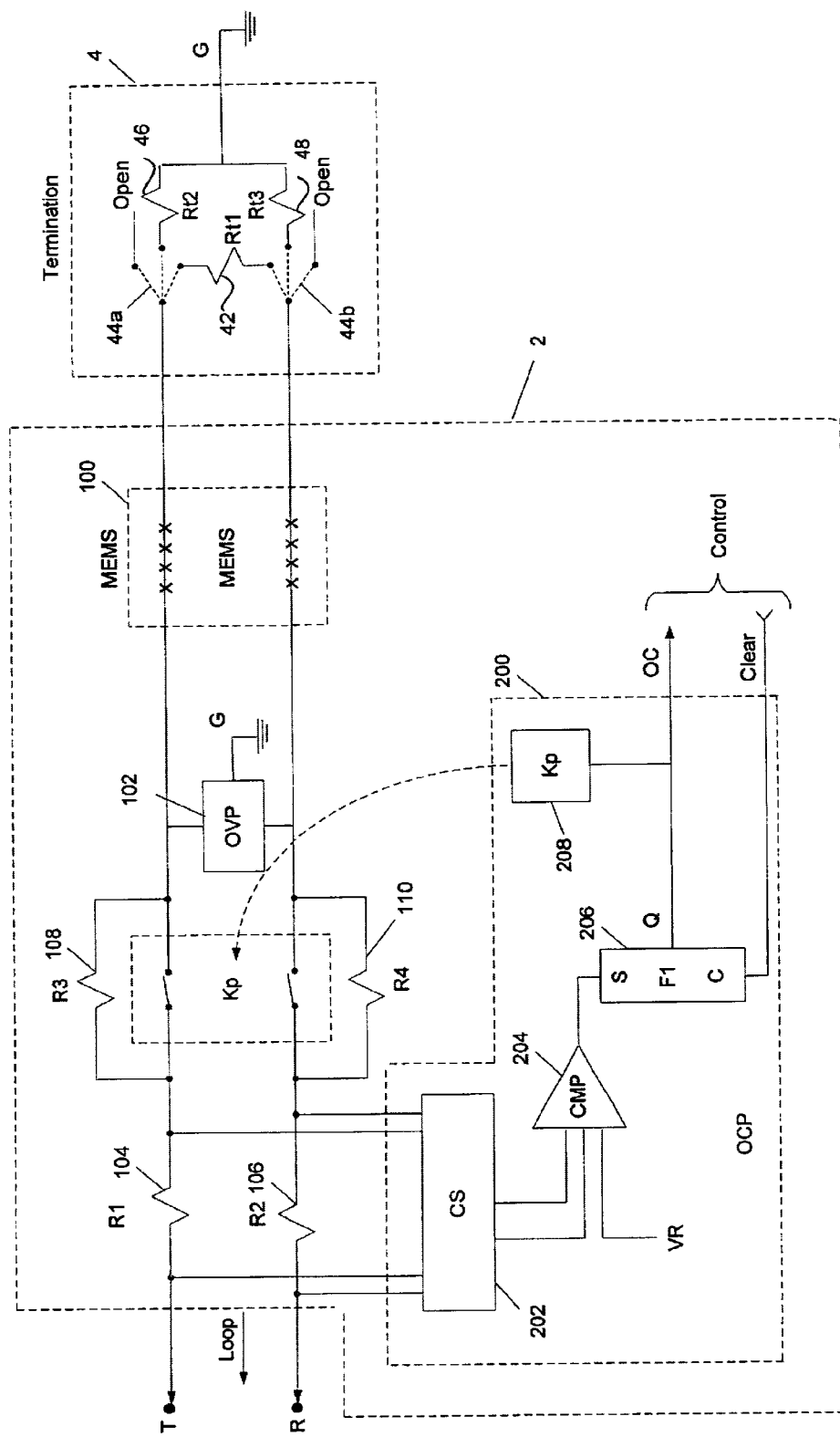
FIG. 2 illustrates a detailed block diagram in accordance with the first preferred embodiment of the present invention.

FIG. 2 illustrates a detailed block diagram in accordance with the first preferred embodiment of the present invention. As illustrated, the termination unit 4 is coupled to the MEMS unit 2 and includes resistors $R_{t1}$ 42, $R_{t2}$ 46, $R_{t3}$ 48 and a pair of relay contacts 44a, 44b. Resistors $R_{t1}$ 42, $R_{t2}$ 46, $R_{t3}$ 48 represent equivalent circuit termination resistance of the termination unit 4, with an effective ground path connection to the ground G through resistors $R_{t2}$ 46, $R_{t3}$ 48. The MEMS unit 2 includes the MEMS device 100, an over voltage protector ("OVP") 102, resistors R1 104, R2 106, R3 108, R4 110, and an over current protector ("OCP") 200. The OCP 200 includes a current sensor CS 202 coupled to a comparator CMP 204, which itself is coupled to a latch F1 206. The latch F1 206 is further coupled to a relay $K_p$ 208, which contacts of the relay $K_p$ 208 is positioned in between the OVP 102 and resistors R1 104 and R2 106, as shown. As described above, the relay $K_p$ 208 (electromechanical or equivalent device) should be sufficiently robust to withstand high currents and voltages resulting from lightning exposure and electrical power faults. The CS 202, CMP 204, latch F1 206, and relay $K_p$ 208 are well known components/devices and will be discussed in more detail later herein.

When a lighting exposure or AC power surge occurs, the severity of the damage to the MEMS device 100 is very much dependent on the type of termination unit 4 used in the overall system. For example, for POTS-related service, the current loop is through the battery feed resistors such as the resistor $R_{t1}$ 42, which creates a "loop mode." Alternatively, the connection can be to an "open" lead or through DC de-coupling capacitors in the termination unit 4. Connection through the ground G is generally via some finite resistance such as resistors $R_{t2}$ 46, $R_{t3}$ 48 if the circuit operation requires a ground path. Direct connection to the ground G or the resistor $R_{t1}$ 42 can create a high fault current condition. The value of the fault current depends on the value of the resistors $R_{t1}$ 42, $R_{t2}$ 46, $R_{t3}$ 48 and the voltage of the power fault or lightning.

In greater detail, the MEMS device 100 includes n number of contact pairs, where n represents any number. Each contact is represented by the "x" symbol in the figures, and each contact pair (one from the tip wire and one from the ring wire) represents a controllable entity. Accordingly, the MEMS device 100 as illustrated in FIG. 2 includes four controllable entities. Although only four controllable entities are illustrated in the figures for simplicity and ease of explanation, the number of controllable entities in the MEMS unit 2 can be more or less than four, depending on the particular system architecture. The current rating of these contacts are relatively low as compared to the relay $K_p$ 208. Similarly, the voltage breakdown across open contacts, and between contacts of different pairs, and between contacts and the body of the MEMS device 100, are also relatively low. Therefore, any current and voltage that exceeds a rated value will likely damage the MEMS device 100.

Figure 4:
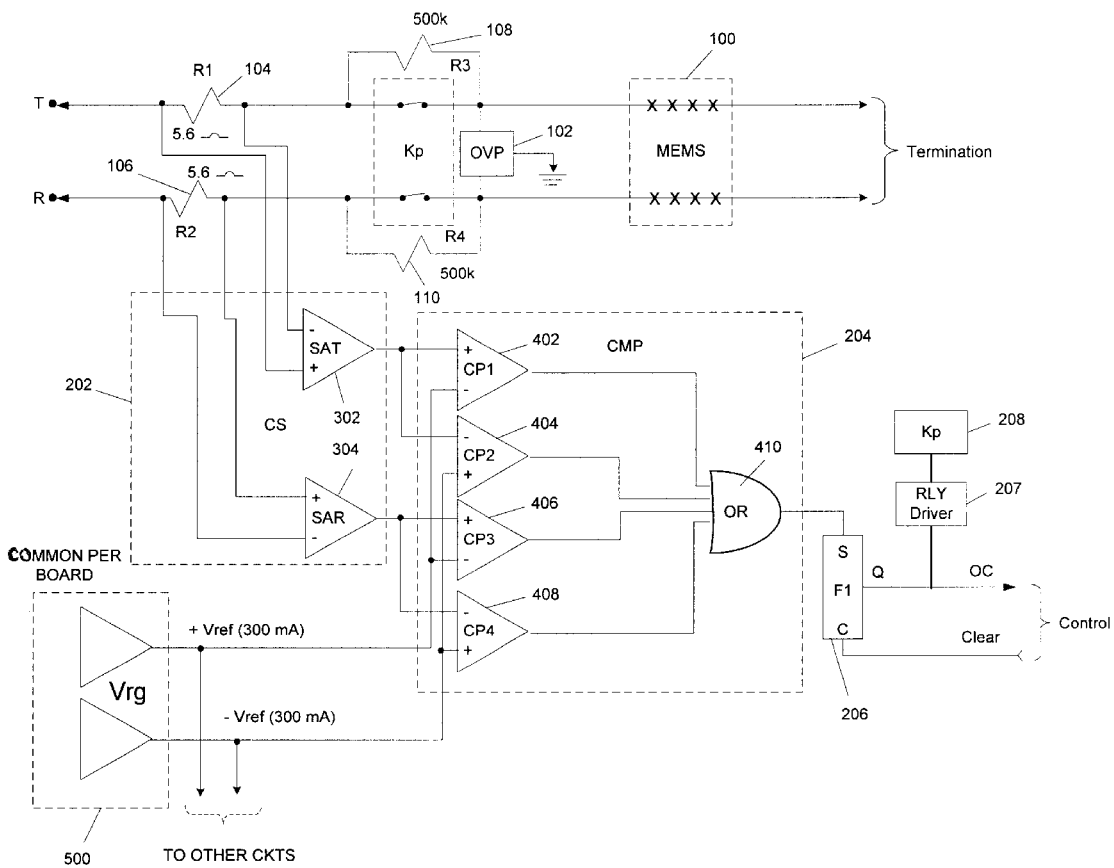
FIG. 4 illustrates an example of a detailed circuit diagram of FIG. 2 in accordance with the first preferred embodiment of the present invention.

FIG. 4 illustrates an example of a detailed circuit diagram of FIG. 2 in accordance with the first preferred embodiment of the present invention. In greater detail, the CS 202 consists of amplifiers SAT 302 and SAR 304, where each amplifier inputs is connected across the resistors R1 104 and R2 106, respectively. The CMP 204 includes four (more or less can be used in alternative embodiments) comparators CP1 402, CP2 404, CP3 406, and CP4 408, which outputs are coupled to an OR gate 410. The outputs of amplifier SAT 302 are inputted into the positive input of the CP1 402 and the negative input of the CP2 404. Likewise, the outputs of amplifier SAR 304 are inputted into the positive input of the CP3 406 and the negative input of the CP4 408.

Reference voltages, which define the thresholds of the maximum current permitted to flow through the MEMS device 100, are also inputted into the comparators from a voltage reference generation circuit for comparing them to the sensed current. The voltage reference generation circuit is represented by Vrg 500 in FIG. 4. For example, a positive reference voltage is inputted into the negative inputs of the comparators CP1 402 and CP3 406. Likewise, a negative reference voltage is inputted into the positive inputs of the comparators CP2 404 and CP4 408. Negative and positive reference voltages are needed in order to compare the current flowing in both directions in the subscriber loop.

Reference will now be made concurrently to FIGS. 2 and 4 for a more complete understanding of the first preferred method of protecting the MEMS device 100. Under normal operating condition or no-fault condition, the termination unit 4 is connected to the outside plant subscriber loop through the contacts of the relay $K_p$ 208. The relay $K_p$ 208 is in its de-energized or "closed" state, as illustrated in the FIGS. 2 and 4.

When a lightning exposure or AC power surge occurs, the CS 202 senses the current across the resistors R1 104 and R2 106 in both leads of the loop. The resistors R1 104 and R2 106 have low values, preferably in the range of about 1–20 ohms. The sensed current is converted into voltage by the CS 202 and inputted into the CMP 204 for comparing the voltage with the reference voltage $V_r$. Preferably, the reference voltages are represented by both positive and negative polarities of the same magnitude. If the voltage from the CS 202 exceeds the reference voltage $V_r$, then latch F1 206 is set via the OR gate 410, thereby energizing or "opening" the relay $K_p$ 208 (opposite to that shown in FIGS. 2 and 4). When the relay $K_p$ 208 is opened or energized, this prevents the MEMS device 100 from being damaged by the high current or voltage.

The resistors R3 108 and R4 110 have high values of about 50–1000 k and are used for monitoring the subscriber loop after an over current event has been detected. A test head (not shown) is coupled to the resistors R3 108 and R4 110 via the MEMS device 100 to monitor the loop. Since the relay $K_p$ 208 is opened after the detection of the over current event, the loop current can flow through the resistors R3 108 and R4 110. Thus, the system can monitor the loop pair for electrical condition through resistors R3 108 and R4 110 periodically (i.e., ms or seconds) or on-demand without subjecting the MEMS device 100 to potential high current/voltage damage. After the system has ascertained that there is no longer hazardous voltage on the loop pair, the relay $K_p$ 208 can then be "reset" back to its de-energized state.

A highly intelligent system is disclosed herein since monitoring of the loop can be performed via the resistors R3 108 and R4 110. This allows system control to constantly scan or monitor the loop pair so that the relay $K_p$ 208 can be reset back to its normal condition when hazardous voltage is no longer present in the loop, which process is described in more detail later herein. Again, the relay $K_p$ 208 is preferably a robust non-latching type relay to insure that it can revert back to its "de-energized" or "reset" mode in the event of a system power failure. When initializing the system, a clear signal is inputted into the latch F1 206 to reset latch F1 206 to put the relay $K_p$ 208 into the de-energized state.

When an over current condition is sensed, a "set" output is generated from at least one of the comparators CP1 402, CP2 404, CP3, 406, CP4 408, which is sent to the OR gate 410 before it is inputted into the "s" (set) input of the latch F1 206. The latch F1 206 then sends an over current (OC) signal to a relay driver 207. Conversely, when a "reset" or "clear" signal is inputted into the "c" (clear) input of the latch F1 206, this signal is then sent to the relay driver 207, thereby resetting the relay $K_p$ 208. The OC signal can also be monitored by the system control.

For example, a logical 1 at the output of OR gate 410 produces a logical 1 at the Q output of the latch F1 206. The signal Q is then sent to the relay driver 207. If the signal Q is a logical 1, the relay driver 207 will energize the relay $K_p$ 208. On the other hand, if the detected signal produces a logical 0 at the latch F1 206 output, the relay $K_p$ 208 remains in its de-energized state.

As described above, the components in the OCP 200 are used to control the relay $K_p$ 208 therein for protecting the MEMS device 100 mainly against high current. The OVP 102, on the other hand, is used when there is a very fast rise time and high voltage signal of short duration such as lightning and when the relay $K_p$ 208 cannot be energized fast enough. For example, when the voltage increases because of lightning exposure (i.e., 1000 V) or AC power surge, the OVP 102 is used to clamp/limit the voltage to some predetermined maximum value of, e.g., 300–350 V, depending on the voltage that the MEMS device 100 can handle. The range of this value is between the maximum operating voltage under normal condition (lower limit) and the maximum tolerable voltage (upper limit) of the MEMS device 100. In this manner, interference to the customer is minimized. Since the lightning is a very fast event (microsecond), the OVP 102 is needed to clamp/limit the voltage and is designed to respond in nanoseconds.

When the lightning exposure or power surge is detected, the relay $K_p$ 208 is energized and remains in that state. Since the relay $K_p$ 208 is controlled by the latch F1 206, it stays open (remains energized) until a clear signal is sent. During its scanning or monitoring state, the system periodically, i.e., every 2 ms, or on-demand scans or monitors the over current status at the Q output of the latch F1 206. If the Q output is a logical 1, it means that an over current event has occurred, and that the relay $K_p$ 208 has been energized. The system can then monitor the loop pair via the resistors R3 108, R4 110 (i.e., fault has been isolated from the MEMS device 100) for the presence of hazardous voltages on the loop. If and when the hazardous voltage is no longer present, the system control sends a clear signal to the latch F1 206 to reset Q output to a logical 0, which in turn, de-energizes the relay $K_p$ 208 back to its normal state.

Figure 3:
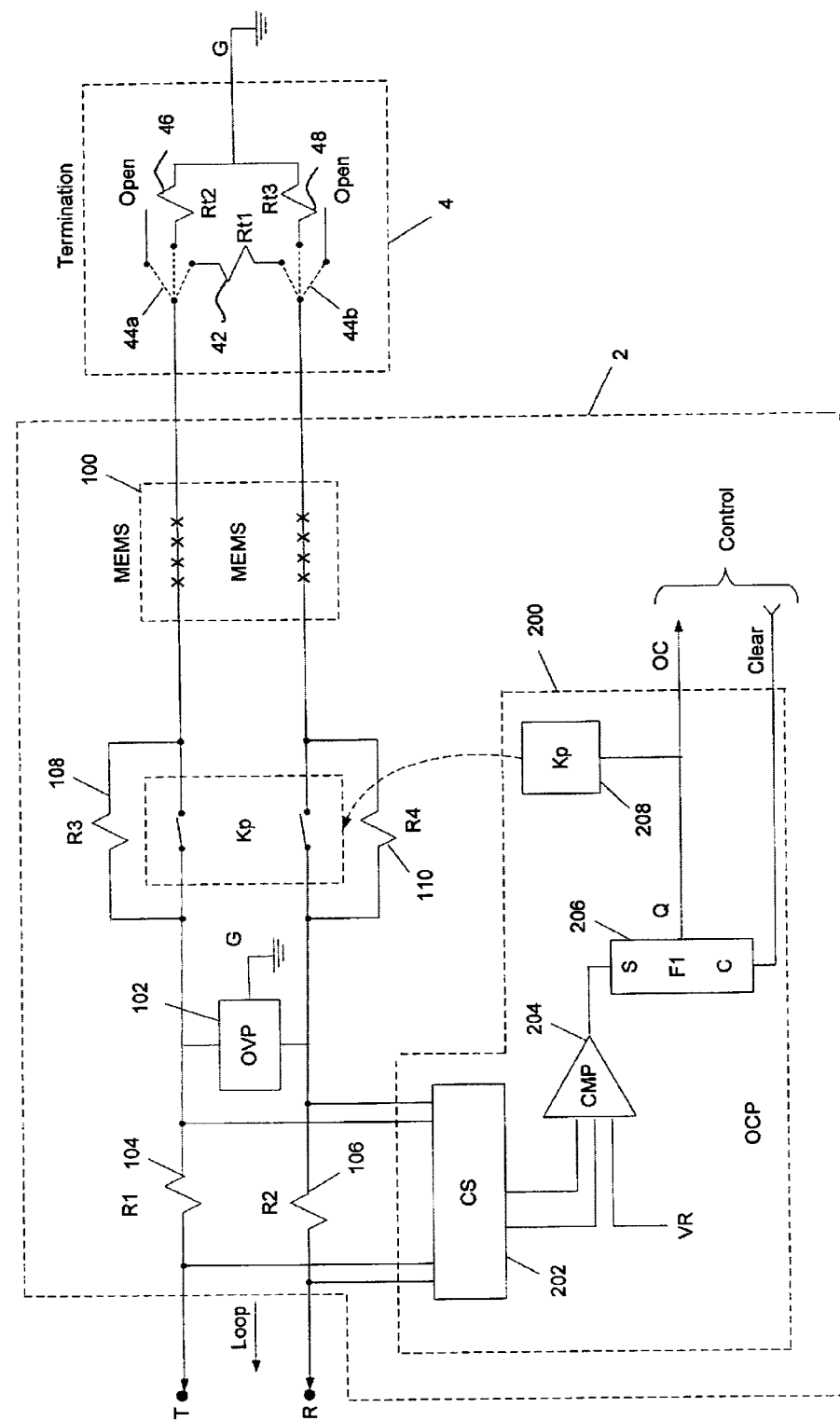
FIG. 3 illustrates a detailed block diagram in accordance with the second preferred embodiment of the present invention.

FIG. 3 illustrates a detailed block diagram in accordance with the second preferred embodiment of the present invention. The system according to the second preferred embodiment includes the elements and components similar to those described in the system of the first preferred embodiment, except that the OVP 102 is positioned in between the sensing resistors R1 104, R2 106 and the relay $K_p$ 208. In this embodiment, the OVP 102 should be more robust than in the first embodiment and capable of surviving a power cross event.

Figure 5:
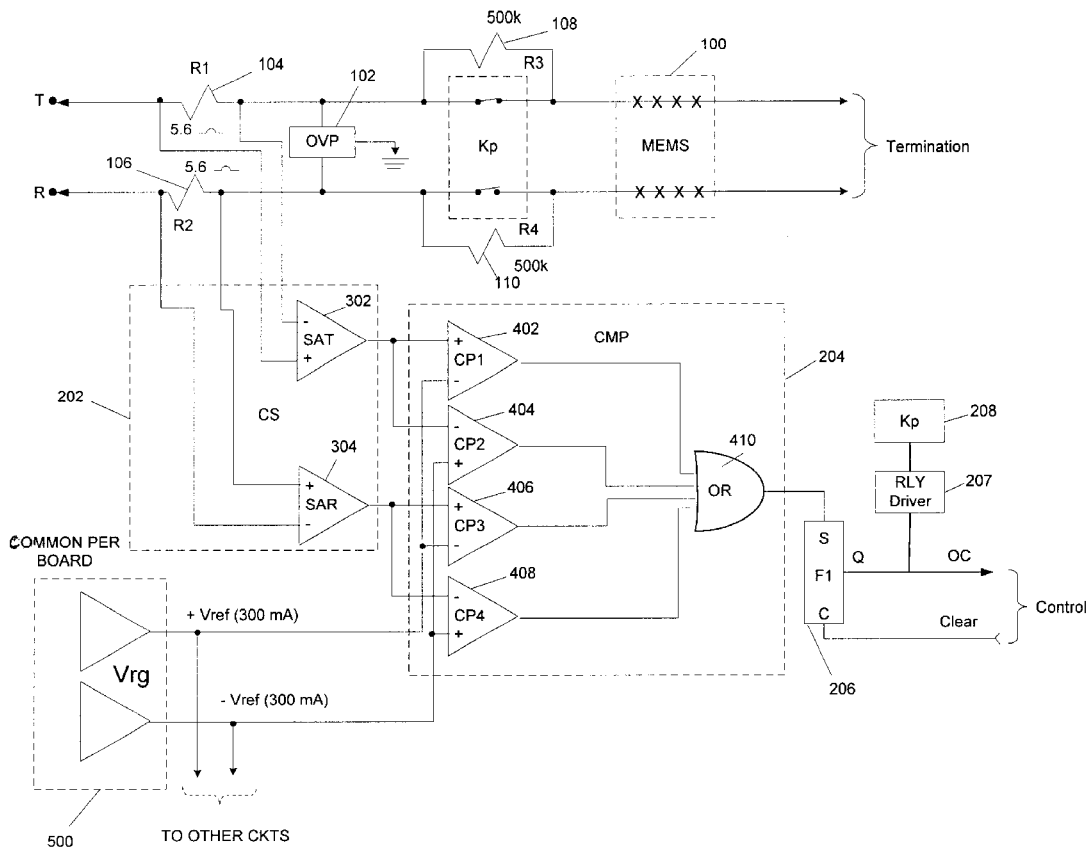
FIG. 5 illustrates an example of a detailed circuit diagram of FIG. 3 in accordance with the second preferred embodiment of the present invention.

FIG. 5 illustrates an example of a detailed circuit diagram of FIG. 3 in accordance with the second preferred embodiment of the present invention. The circuitry according to the second preferred embodiment includes the elements and components similar to those described in the circuitry of the first preferred embodiment, but the OVP 102 is positioned in between the sensing resistors R1 104, R2 106 and the relay $K_p$ 208.

In the implementation of the CS 202, signal conditioning circuit such as an attennuator may be needed to map the high voltage signal that could exist at the tip and ring leads, to be within the voltage operating range of the electronics for proper operation. The attennuator can also be used to protect the electronics associated with the implementation of the CS 202. These types of design requirement/technique should be evident to those skilled in the art of circuit design.

Figure 6:
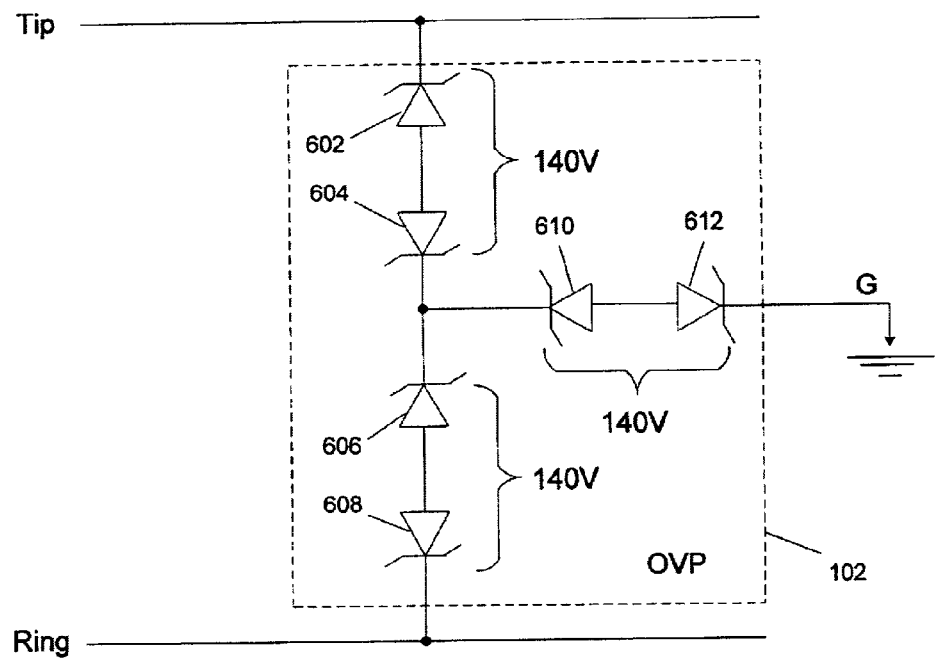
FIG. 6 illustrates a first example of a detailed circuit diagram of the over voltage protector in accordance with the first and second preferred embodiments of the present invention.
Figure 7:
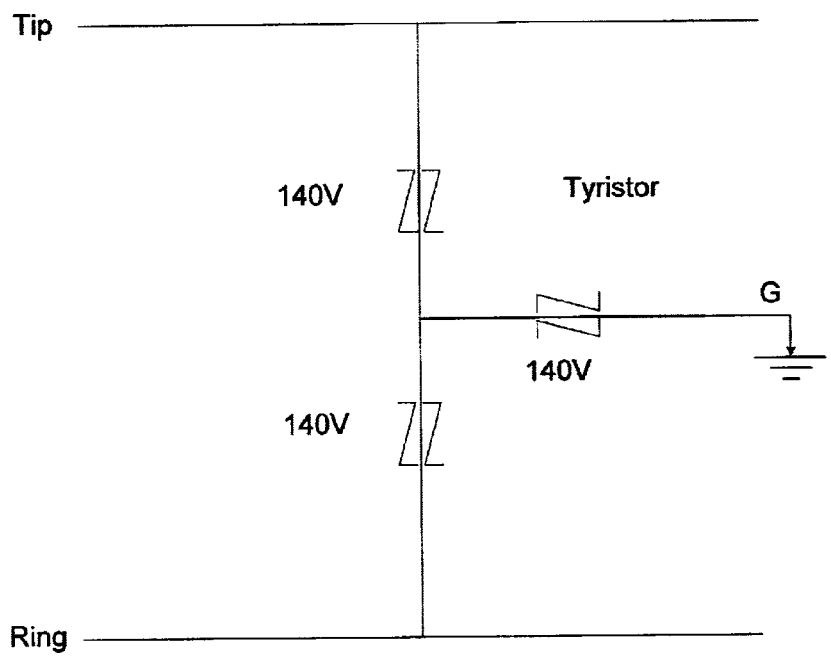
FIG. 7 illustrates a second example of a detailed circuit diagram of the over voltage protector in accordance with the first and second preferred embodiments of the present invention.

FIG. 6 illustrates a first example of a detailed circuit diagram of the over voltage protector 102 in accordance with the first and second preferred embodiments of the present invention. In this embodiment, the OVP 102 is represented by three pair of zener diodes. The first pair includes diodes 602, 604, the second pair includes diodes 606, 608, and third pair includes diodes 610, 610. FIG. 7 illustrates a second example of a detailed circuit diagram of the over voltage protector 102 in accordance with the first and second preferred embodiments of the present invention. In this example, the OVP 102 is represented by three Tyristors. The clamp voltages selected for the zener diodes and Tyristors are normally about 140 V so as to obtain a nominal effective clamp voltage of about 280 V for tip to ring, tip to ground, and ring to ground configurations.

A system software program can be used to monitor the various components, devices, events and conditions of the loop pair that are described above. The system software can receive information or status about loop voltages and over current conditions/events associated with the particular loop pair. The relays described herein can be switched via software, hardware, or combinations thereof Further, although only one relay $K_p$ 208 is illustrated herein, it is understood that more than one relay can be used and is within the scope of the present invention.

In other embodiments, other components can be substituted for the specific components described herein so long as these components perform essentially identical functions as described herein.

In the previous descriptions, numerous specific details are set forth such as system architecture, circuit layouts, electronic components, component values, etc. to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

We claim:

1. A method of protecting a switching device against damage resulting from an electrical power fault, the switching device positioned in a subscriber loop in a telecommunication system, the method comprising:

sensing a current in the subscriber loop after the electrical power fault using a first pair of resistors coupled to the subscriber loop;

comparing the current with a reference value to determine if the current is greater than the reference value;

energizing a relay coupled to the subscriber loop if the current is greater than the reference value, the energizing of the relay reducing the value of the current in the switching device, thereby protecting the switching device against damage; and reducing the current in the switching device loop using a second pair of resistors that is coupled to the subscriber loop.

2. A method according to claim 1, wherein the value of each of the first pair of resistors is about 1–20 ohms.

3. A method according to claim 1, wherein comparing the current with the reference value comprises using an over current protector coupled to the subscriber loop.

4. A method according to claim 3, wherein the over current protector comprises a current sensor, a comparator, a latch, and the relay.

5. A method according to claim 4, wherein the relay is coupled to and controlled by the latch.

6. A method according to claim 1 further comprising monitoring the subscriber loop after the electrical power fault has been detected using the second pair of resistors.

7. A method according to claim 6 further comprising de-energizing the relay in the subscriber loop, the de-energizing of the relay occurring after the value of the current is reduced to a tolerable value.

8. A method according to claim 1, wherein the value of each of the second pair of resistors is about 50–1000 k.

9. A method according to claim 1 further comprising limiting an electrical power fault voltage that is exposed to the switching device before energizing the relay.

10. A method according to claim 1, wherein the electrical power fault includes lightning exposure.

11. A method according to claim 1, wherein the electrical power fault includes an electrical power surge.

12. A system for protecting a switching device against damage resulting from an electrical power fault, wherein the switching device is positioned in a subscriber loop in a telecommunication system, the system comprising:

means for sensing a current in the subscriber loop after the electrical power fault, wherein the means for sensing the current comprises an over current protector coupled to a first pair of resistors on the subscriber loop;

means for comparing the current with a reference value to determine if the current is greater than the reference value;

means for energizing a relay coupled to the subscriber loop if the current is greater than the reference value, the energizing of the relay reducing the value of the current in the switching device, thereby protecting the switching device against damage; and a second pair of resistors coupled to the subscriber loop, wherein the second pair of resistors is used to reduce the value of the sensed current in the switching device.

13. A system according to claim 12, wherein the value of each of the first pair of resistors is about 1–20 ohms.

14. A system according to claim 12, wherein the means for comparing the current with the reference value comprises the over current protector having inputted therein the reference value.

15. A system according to claim 12, wherein the over current protector comprises a current sensor, a comparator, a latch, and the relay.

16. A system according to claim 15, wherein the relay is coupled to and controlled by the latch.

17. A system according to claim 12 further comprising a test head adapted to monitor the subscriber loop using the second pair of resistors after the electrical power fault has been detected.

18. A system according to claim 17 further comprising means for de-energizing the relay in the subscriber loop after the value of the current is reduced to a tolerable value.

19. A system according to claim 12, wherein the value of each of the second pair of resistors is about 50–1000 k.

20. A system according to claim 12 further comprising means for limiting an electrical power fault voltage that is exposed to the switching device.

21. A system according to claim 20, wherein the means for limiting includes an over voltage protector.

22. A system according to claim 21, wherein the over voltage protector includes a plurality of zener diodes or tyristors.

23. A system according to claim 12, wherein the switching device comprises one of a micro electro-mechanical system (MEMS), solid state relay, and a mechanical relay.

24. A system for protecting a switching device against damage resulting from an electrical power fault, wherein the switching device is positioned in a subscriber loop in a telecommunication system, the system comprising:

an over current protector having a relay, the over current protector adapted to sense a current in the subscriber loop after the electrical power fault and compare the current with a reference value, wherein the subscriber loop includes a tip and ring and wherein the over current protector protects the tip and ring when an over current condition is sensed from at least one of the tip or ring;

the relay coupled to the subscriber loop, the relay adapted to be energized if the current is greater than the reference value, wherein the energized relay is used to reduce the value of the current in the switching device;

an over voltage protector coupled to the subscriber loop and adapted to limit an electrical power fault voltage in the subscriber loop;

a first pair of resistors coupled to the subscriber loop and the over current protector; and a second pair of resistors coupled to the subscriber loop, wherein the second pair of resistors is used to reduce the value of the sensed current in the switching device.

25. A system according to claim 24, wherein the value of each of the first pair of resistors is about 1–20 ohms.

26. A system according to claim 24, wherein the over current protector comprises a current sensor, a comparator, a latch, and the relay.

27. A system according to claim 26, wherein the relay is coupled to and controlled by the latch.

28. A system according to claim 24 further comprising a test head adapted to monitor the subscriber loop using the second pair of resistors after the electrical power fault has been detected.

29. A system according to claim 24, wherein the value of each of the second pair of resistors is about 50–1000 k.

30. A system according to claim 24, wherein the over voltage protector includes a plurality of zener diodes or tyristors.

31. A system according to claim 24, wherein the switching device comprises one of a micro electro-mechanical system (MEMS), solid state relay, and a mechanical relay.

32. A system for protecting switching devices against damage resulting from an electrical power fault, wherein the switching devices are positioned in a subscriber loop in a telecommunication system, the system comprising:

means for sensing a current in the subscriber loop after the electrical power fault to compare the current with a reference value;

means for energizing a relay coupled to the subscriber loop if the current is greater than the reference value, the energizing of the relay reducing the value of the current in the switching device through resistors, wherein the subscriber loop includes a tip and ring and wherein the current is reduced from the tip and ring when an over current condition is sensed from at least one of the tip and ring;

means for limiting an electrical power fault voltage that is exposed to the switching devices, wherein the means for limiting includes an over voltage protector coupled to a first pair of resistors; and a second pair of resistors coupled to the subscriber loop, wherein the second pair of resistors is used to reduce the value of the sensed current in the switching devices.

\* \* \* \* \*